April 16, 1929.  H. SCHULZ  1,709,442
JOURNAL BEARING
Filed Jan. 6, 1927
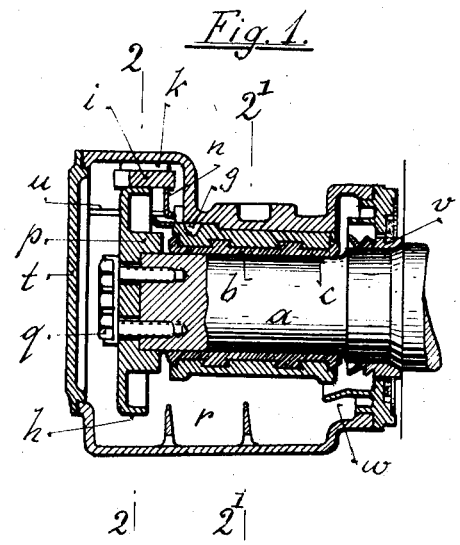
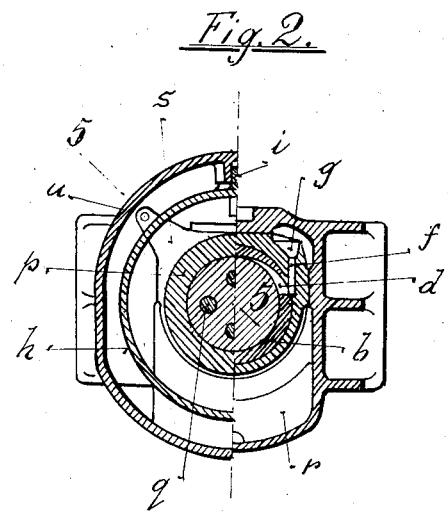
Inventor
Hans Schulz
per his attorney Patented Apr. 16, 1929.

1,709,442

UNITED STATES PATENT OFFICE.

HANS SCHULZ, OF ELBERFELD, GERMANY, ASSIGNOR TO THE FIRM: G. & J. JAEGER, AKTIENGESELLSCHAFT, OF ELBERFELD, GERMANY.

JOURNAL BEARING.

Application filed January 6, 1927, Serial No. 159,316, and in Germany September 28, 1925.

Journal bearings often give rise to trouble, particularly in railway practice, owing to overheating resulting from insufficient lubrication of the sliding friction surfaces. The purpose of this invention is to eliminate such troubles, and its object is a construction of bearing which not only affords better lubrication but also provides better storage for the lubricant and readier access to the bearing surfaces.

The invention may be explained in further detail with reference to the example of construction illustrated in the accompanying drawings. In these Figure 1 is a longitudinal section through an axle box containing a journal bearing and Figure 2 a cross-section in part on the line 2—2 and in part on the line $2^1$—$2^1$ of Figure 1.

Figures 3 and 4 show on a larger scale in longitudinal and transverse section respectively the form of the oil space by which the lubricant is distributed over the bearing surfaces.

Figure 5 is a section on the line 5—5 of Figure 2 to a larger scale, and

Figures 6 to 8 explain the form of the doctor or scraper by which the oil is fed to the bearing.

The drawings show the invention applied to a railway axle box. The journal $a$ is surrounded by a brass or lining $b$ which contacts with and rests upon the journal along the line $c$. Recesses $d$ are formed in this brass, constituting wedge-shaped spaces tapering towards the line of contact $c$, and serving to contain a wedge of oil supported at its base. In the brass shown in Figures 3 and 4 the oil is supported by a shoulder or ledge $e$, which also takes any lateral pressure of the journal and prevents the journal shifting horizontally with respect to the wedge-shaped space $d$. To prevent the journal shifting vertically relatively to the wedge of oil—as it might do in a railway vehicle owing to the springing of the axle if the brass merely rested on the axle,—the brass is attached to a brass or stirrup engaging beneath the journal.

On the back of the wedge-shaped spaces $d$ there open passages $f$ which communicate with oil-collecting grooves $g$ on the outer surface of the brass. When the axle is turning these grooves are kept continuously filled with oil by the action of the oil lifting disc $h$ and of the doctor or scraper $i$, so that a wedge of oil is constantly maintained between the journal and the brass. As the result of the gradual tapering off of this wedge of oil towards the line of contact the wedge of oil is transformed in the region of the load into a thin film such as is required for proper lubrication.

As the formation of this film would be adversely affected if the oil were frothy, the usual form of scraper for feeding the oil is replaced by a doctor of special construction, the purpose of which is to lead the oil away without shock or eddying, and so without foaming. For this purpose the doctor $i$ is made in the shape of a turbine blade. It is housed in a boss $k$ upon the axle box, and rests loosely on the oil lifting disc $h$. The part of the doctor contacting with the disc $h$ is sharpened to a knife-edge and scrapes oil off the whole width of the disc, the oil then passing along the curved walls $l$ of the doctor, and if in great quantity along the similarly curved lower part of the wall $m$ of the boss $k$. Both the doctor and the boss are curved not only in the direction of travel of the oil but also at right angles to that direction, and so form a deflector, similar to a turbine blade, by which the oil scraped from the disc is led without shock or eddying to the receiving grooves $g$ in the brass. The doctor has two such curved surfaces, which are mirror reflections the one of the other, so that it may operate equally effectively whichever way the axle turns.

The oil scraped off by the doctor is normally propelled along its surface to the grooves $g$ by the momentum imparted to it by the disc. At very slow speeds this momentum might be insufficient to overcome the resistance to travel of the oil along the surfaces $l$. To provide against this a drip nose $n$ is located beneath the curved surfaces $l$. When the kinetic energy of the oil is exhausted its potential energy may be drawn upon to lead it down this drip nose to a channel situated at a lower level which also leads to the grooves $g$. At slow speeds of rotation the oil passes down over the drip nose $n$, at higher speeds it flows off the end of the curved surface $l$. The action of the doctor is not affected by longitudinal movement of the axle relatively to the axle box, and it can follow displacements in the vertical direction which may arise for instance from wear.

It is particularly desirable in railway practice that the lubrication shall remain satisfactory over long periods without attention. To ensure the above-explained oil film formation continuing as long as possible the head $p$ which takes longitudinal pressure of the bearing is attached to the journal $a$ by set screws $q$. It is thus possible to assemble the bearing or take it to pieces endwise without the axle box being lifted. With such a detachable head a better oil-tight and dust-proof joint can be made where the journal enters the axle box than is possible with the usual form of head integral with the axle. Consequently the oil reservoir space $r$ in the axle box into which the superfluous oil delivered by the disc $h$ falls can be filled to a higher level. The bearing needs less attention than those hitherto made, both because the greater quantity of oil thus stored lasts longer and also because the better protection against dust prolongs the life of the bearing. A further advantage of a separate screwed-on head is that there is no rounding off between the journal and the head as when the head is integral with the journal; such rounding prevents axial stress being fairly taken and is a frequent cause of bearings running hot. Moreover the head being removable the upper and lower brasses above described may be made in one piece; this obviates the need for special supports to fix the journal relatively to the wedge of oil; and also makes the brass a good deal firmer so that it is possible to make it of less resistant material. Where desired, to save material and work, the brasses and axle boxes may be made in one piece. Preferably the screwed-on head also forms, as shown in the drawing, the oil lifting disc $h$.

The brass being inserted axially it must be secured against axial movement while in use. For this purpose tongues $s$ are provided upon the end face of the brass; these rest against a part of the axle box, and when the cover of the axle box is put on, studs $u$ set in the cover abut upon these tongues and so keep the brass in place, while it is immediately freed for removal by taking off the axle box cover and the head $p$.

In the axle box shown in Figures 1 and 2 an oil-tight joint is made about the journal where it enters the axle box by a bronze packing ring $v$ having an oil throw-off, there being an oil catch space beside it. The shock-damping space $w$ in the axle box protects this packing device from splashing and drenching with oil, and so prevents loss of oil and dirtying of the axle box such as often occurs when a railway vehicle mounts brake shoes or wagon tippers.

What I claim is:—

1. In an axle box the combination of a journal, a brass upon said journal having radial tongues at its outer end resting against a part of said axle box, a detachable head upon said journal retaining said brass, a cover for said axle box, and means carried by the cover for pressing said tongues against said axle box to prevent axial movement of said brass.

2. In an axle box the combination with a journal, of a brass thereon having oil spaces therein, an oil lifting disc rotating with said journal, a boss upon said axle box, a doctor slidably mounted in said boss and having an edge contacting yieldingly with said disc and a surface curving from said edge in both vertical and horizontal planes and leading to said oil spaces, said boss having a curved surface conforming to that of the doctor.

3. In an axle box, the combination, with a journal, of a brass thereon having oil spaces therein, an oil lifting disk rotating with said journal, and a doctor having an edge contacting yieldingly with said disk and a surface curving from said edge in both vertical and horizontal planes and leading to said oil spaces.

In testimony whereof I have signed my name to this specification.

HANS SCHULZ.